(12) United States Patent
Kågebäck et al.

(10) Patent No.: US 8,262,370 B2
(45) Date of Patent: Sep. 11, 2012

(54) COOLING SYSTEM FOR A BLOWER

(75) Inventors: Mikael Kågebäck, Jönköping (SE);
Andreas Larsson, Aneby (SE); Lars Malmqvist, Forserum (SE); Andreas Hedlund, Jönköping (SE); Lotta Norinder, Jönköping (SE); Anna Sjögren, Jönköping (SE); Anders Jakobsson, Hjo (SE)

(73) Assignee: Husqvarna AB, Huskvarna (SE)

( * ) Notice: Subject to any disclaimer, the term of this patent is extended or adjusted under 35 U.S.C. 154(b) by 948 days.

(21) Appl. No.: 10/578,160

(22) PCT Filed: Nov. 18, 2004

(86) PCT No.: PCT/SE2004/001696
§ 371 (c)(1),
(2), (4) Date: Aug. 29, 2006

(87) PCT Pub. No.: WO2005/049926
PCT Pub. Date: Jun. 2, 2005

(65) Prior Publication Data
US 2007/0092384 A1    Apr. 26, 2007

(30) Foreign Application Priority Data

Nov. 24, 2003 (SE) .................................. 0303130-9

(51) Int. Cl.
*F04B 17/00* (2006.01)
*F04B 35/00* (2006.01)
*F04B 39/02* (2006.01)
*F04B 39/06* (2006.01)

(52) U.S. Cl. ...................... 417/371; 417/234; 417/423.8
(58) Field of Classification Search ................ 15/327.5, 15/405; 417/371, 234, 423.8, 423.14
See application file for complete search history.

(56) References Cited

U.S. PATENT DOCUMENTS

| | | | | |
|---|---|---|---|---|
| 3,924,899 A * | 12/1975 | Salete | ............................ | 406/94 |
| 5,195,208 A * | 3/1993 | Yamami et al. | ................ | 15/326 |
| 5,813,088 A * | 9/1998 | Wagner et al. | ............... | 15/327.5 |
| 6,305,048 B1 * | 10/2001 | Salisian | ......................... | 15/326 |
| 6,308,375 B1 * | 10/2001 | Whitney | ........................ | 15/347 |
| 2001/0004437 A1 | 6/2001 | Nantt et al. | | |
| 2002/0166195 A1 * | 11/2002 | Dahlberg et al. | ............ | 15/327.5 |

* cited by examiner

*Primary Examiner* — Peter J Bertheaud
(74) *Attorney, Agent, or Firm* — Nelson Mullins Riley & Scarborough LLP

(57) ABSTRACT

Arrangement in a blower including at least an engine and a fan, the fan includes a fan housing enclosing a fan wheel and a fan inlet. The engine and fan are surrounded by a casing provided with an air inlet to let air in to the fan inlet placed inside the casing. The air stream from the air inlet in the housing to the fan inlet cools the engine and components inside the casing before it enters the fan inlet and leaves the blower via a blower tube. The fan housing is provided with an opening (31) placed in the fan housing so that air is allowed to leave the fan in case of blocked air stream in the fan outlet or blower tube.

10 Claims, 3 Drawing Sheets

COOLING SYSTEM FOR A BLOWER

BACKGROUND OF THE INVENTION

The claimed invention relates to an arrangement in a blower comprising at least an engine and a fan. The fan comprises a fan housing surrounding a fan wheel, a fan inlet and a fan outlet. The engine and fan are surrounded by a casing provided with an air inlet to let air in to the fan inlet placed somewhere inside the casing. The air stream from the air inlet in the casing to the fan inlet cools the engine and components inside the casing before it enters the fan inlet and leaves the blower via a blower tube.

Engine powered blowers are frequently used for different kinds of work outdoor. The number of areas where blowers are used are increasing. In many areas are blowers replacing traditional brooms since a blower is an efficient and time saving tool for cleaning of large areas such as parking places, pavements and lawns.

In order to reduce the sound emitted from the tool does an insulated casing surround the engine and related components in the tool machinery. In order to make the insulating casing effective is the casing provided with as few and small openings as possible. The engine and some of the components inside the casing, however, generates a lot of heat when they are running and it is important that the components inside the casing are cooled in order to prevent tool break down because of overheated and damaged components inside the casing.

The engine rotates a fan comprising a fan housing enclosing a fan wheel and a circular fan outlet placed around the periphery of the fan wheel. The air to the fan enters the casing through an opening in the casing and passes the engine and the components inside the casing that needs cooling on its way to the fan inlet placed inside the casing. The cool air is thereby cooling the engine and components before it enters the fan inlet and then finally leaves the tool via an exit opening in the fan housing and a bower tube connected to the exit opening in the fan housing. The operator maneuvers the blower tube to make the tool perform the intended work.

This solution works satisfying as long as the air is passing through the fan and the blower tube. If the air stream through the blower tube or the fan for some reason is blocked or stopped will no cool air be sucked into the casing and the fan. This means that no cool air will pass the engine and components inside the casing and the cooling of the engine and components is thereby not working as intended. If this happens is it a risk that the engine or someone of the components inside the casing will overheat and cause a break down of the tool.

BRIEF SUMMARY OF THE INVENTION

The claimed invention eliminates the risk that the engine or components inside the casing will overheat in case of blocked or stopped air stream through the fan or blower tube.

The problem is solved by providing the fan housing that encloses the fan wheel and fan outlet with an opening placed somewhere in the fan housing.

If the air stream through the fan or blower tube for some reason is blocked will the pressure inside the fan and blower tube increase since no air leaves the system. The increased pressure inside the fan generates an air stream through the opening in the fan housing. The air stream through the opening reduces the pressure inside the fan housing and makes it possible for cool air to enter the fan inlet so that the cooling of the engine and components inside the casing will be maintained even though the blower tube or fan is blocked.

The opening in the fan housing is placed so that the opening is pointing towards a section of the tool casing where the heated air stream from the opening could be lead out from the casing to avoid that the heated air is circulated inside the casing and increases the temperature inside the casing further. The opening is preferably placed in a position on the fan housing where the pressure inside the fan housing is low during normal running of the blower to minimize the amount of leaking air through the opening during normal running conditions. One preferred position for the opening is close to the periphery of the fan wheel on the side of the fan housing that is facing towards the operator.

BRIEF DESCRIPTION OF THE DRAWINGS

One embodiment of the claimed invention is illustrated in the figures.

DETAILED DESCRIPTION OF THE INVENTION

Figure 1:
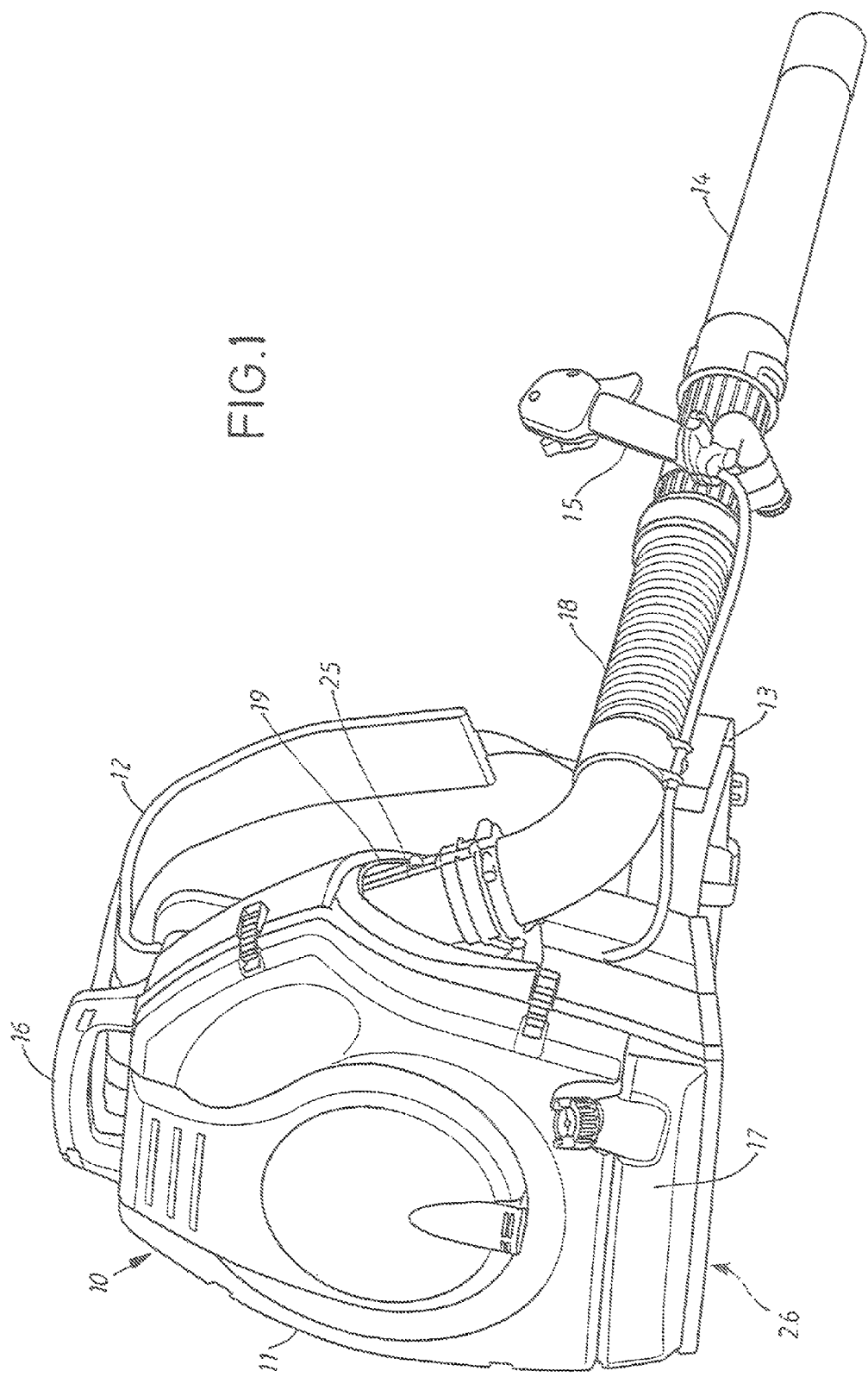
FIG. 1. Illustrates a perspective view of a blower.

In FIG. 1 is a blower 10 illustrated. The blower 10 comprises an insulating casing 11 surrounding a tool engine 20 and machinery. The casing 11 is provided with two straps 12 and a waist belt 13 to make it possible for the operator to carry the blower comfortably on the back. A blower tube 14 with a flexible section 18 is extending from an exit opening 19 in the casing 11 placed on the right side of the blower body. The blower tube 14 is placed close to the hip of the operator and the end of the blower tube 14 positioned in front of the operator during use. The operator controls the movement of the blower tube 14 with a handle 15 or a handle bar placed on the blower tube 14. Some blowers have a handle 15 provided with a lever to control the speed of the engine 20. On the topside of the casing 11 is a handle 16 placed to facilitate transports and movements of the blower 10 when it not is placed on the back of the operator and in the lower section of the blower 10 is a fuel tank 17 placed where it is easy for the operator to refill the fuel tank 17.

Figure 2:
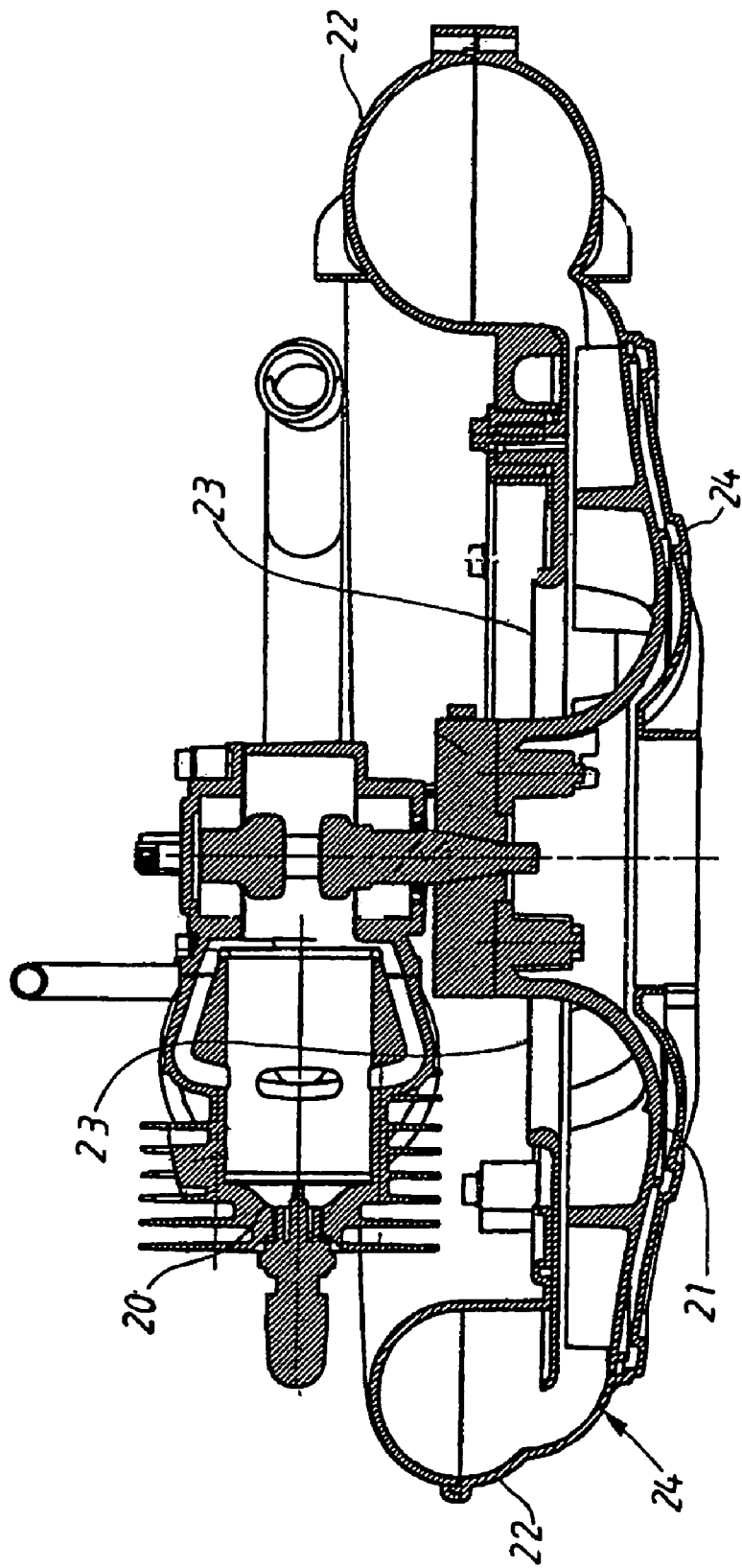
FIG. 2. Illustrates a cross section through the centre of the fan and engine placed inside the blower casing.

The tool engine 20, illustrated in FIG. 2, is powering a fan also placed inside the casing 11. The fan comprises a fan housing 24 enclosing a fan wheel 21 and a circular fan outlet 22 placed around the periphery of the fan wheel 21. The fan wheel 21 is placed parallel to the back of the operator and the engine 20 is placed in axial direction outside the fan wheel 21. In the bottom of the casing 11 is an air inlet 26 for air to the fan placed (see arrowhead in FIG. 1 pointing to the underside of the blower 10). The air enters the air inlet in the bottom of the casing 11 and passes the engine 20 and other components that need cooling on its way to a fan inlet 23 placed on the side of the fan wheel 21 facing away from the operator. The air to the fan is thereby cooling the engine and components inside the casing 11 before it enters the fan inlet 23 and leaves the blower 10 via the blower tube 14 connected to an outlet pipe 25 on the fan housing 24. The outlet pipe 25 is placed close to the exit opening 19 in the casing 11.

If the air stream through the fan housing 24 or blower tube 14 for some reason is blocked will the cooling of the engine 20 and related components placed in the air stream to the fan inlet 23 be lost since no air will pass through the fan housing 24 and blower tube 14.

The claimed invention ensures that the engine 20 and components inside the casing 11 will be cooled even though the air stream through the fan housing 24 or blower tube 14 is blocked.

Figure 3:
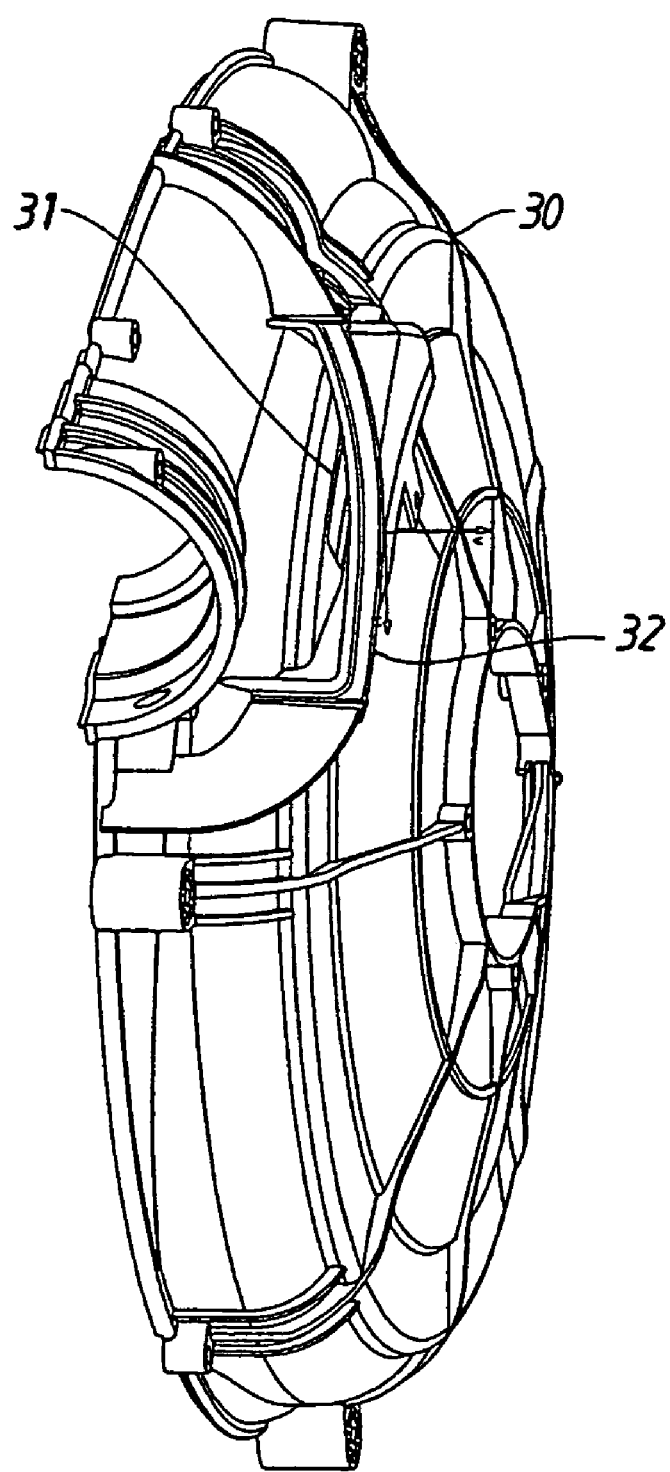
FIG. 3 Illustrates a perspective view of a section of the fan.

The claimed invention is illustrated in the perspective view in FIG. 3. In FIG. 3 is one section 30 of the fan housing 24 illustrated. The fan housing 24 is enclosing the fan wheel 21 and comprises the circular fan outlet 22 and outlet pipe 25. The substantially flat side of the section 30 of the fan housing 24 in FIG. 3 is placed towards the back of the operator. The section 30 of the fan housing 24 is provided with an opening 31 placed close to the periphery of the fan wheel 21.

The opening 31 is preferably provided with a guiding cover 32 around at least a part of the opening 31 so that the air stream generated from the opening 31 in case of a blocked fan outlet 22 or blower tube 14 is lead towards the exit opening 19 in the casing 11 where the heated air is allowed to exit the blower casing 11. The air stream from the opening 31 could also be lead through other openings in the tool casing if they are better positioned or for some reason more favorable to use.

The invention claimed is:

1. A blower assembly comprising:
   an engine and a fan, said fan comprising a fan housing enclosing a fan wheel and a fan inlet;
   a casing enclosing said engine and said fan therein, said casing being provided with an air inlet;
   an air path defined from the air inlet to the fan inlet; wherein air is pulled through said air path from said air inlet into said fan inlet by the fan wheel; wherein said air path is defined such that the air pulled by the fan wheel passes and cools the engine on its way into the fan inlet;
   a main discharge outlet leading from the fan housing in the form of an outlet pipe, said outlet pipe leading to a blower tube;
   an alternate discharge opening provided in the fan housing proximate to the fan wheel;
   wherein said alternate discharge opening is located such that air is still pulled from the air inlet of the casing into the fan inlet, thereby passing and cooling the engine, and discharged therethough if said main discharge outlet, or the blower tube, is blocked;
   wherein the alternate discharge opening in the fan housing is disposed proximate to an exit opening in the casing so that air from the alternate discharge opening is allowed to exit the casing.

2. The blower assembly according to claim 1, wherein the alternate discharge opening is placed in a position in the fan housing where the pressure inside the fan housing is low so that the amount of air leaking through the alternate discharge opening is minimized during normal operation of the blower assembly.

3. The blower assembly according to claim 2, wherein the alternate discharge opening in the fan housing is disposed proximate to a periphery of the fan wheel.

4. The blower assembly according to claim 1, wherein at least one part of the alternate discharge opening is surrounded by a guiding cover that leads air from the alternate discharge opening towards the exit opening in the casing.

5. The blower assembly according to claim 3, wherein the alternate discharge opening is placed on a side of the fan housing.

6. The blower assembly according to claim 4, wherein air passes from the fan housing out of the alternate discharge opening and exit opening if there is a complete blockage in the outlet pipe of the fan housing or the blower tube.

7. The blower assembly according to claim 1, wherein air passes through the alternate discharge opening in the fan housing when a blockage is formed anywhere downstream from the fan wheel.

8. The blower assembly according to claim 1, wherein the engine is positioned along an axial direction of the fan wheel on a first side of the fan wheel, and wherein the alternate discharge opening is positioned along the axial direction of the fan wheel on an opposite side of the fan wheel from the engine.

9. The blower assembly according to claim 1, wherein the exit opening is positioned between the casing and the outlet pipe, and wherein the alternate discharge opening is positioned pointing towards the exit opening.

10. A blower assembly comprising:
    an engine and a fan, said fan comprising a fan housing enclosing a fan wheel and a fan inlet;
    a casing enclosing said engine and said fan therein, said casing being provided with an air inlet;
    an air path defined from the air inlet to the fan inlet; wherein air is pulled through said air path from said air inlet into said fan inlet by the fan wheel; wherein said air path is defined such that the air pulled by the fan wheel passes and cools the engine on its way into the fan inlet;
    a main discharge outlet leading from the fan housing in the form of an outlet pipe, said outlet pipe leading to a blower tube;
    an alternate discharge opening provided in the fan housing proximate to the fan wheel;
    wherein said alternate discharge opening is located such that air is still pulled from the air inlet of the casing into the fan inlet, thereby passing and cooling the engine, and discharged therethough if said main discharge outlet, or the blower tube, is blocked;
    wherein rotation of the fan wheel defines a rotational orbit, and wherein the alternate discharge opening is positioned in the fan housing at a periphery of the fan wheel and within the rotational orbit of the fan wheel.

* * * * *